(12) United States Patent
Foster

(10) Patent No.: US 12,222,739 B1
(45) Date of Patent: Feb. 11, 2025

(54) DYNAMIC ORIENTATION OF A PHYSICAL PROJECTION PLATFORM

(71) Applicant: Disney Enterprises, Inc., Burbank, CA (US)

(72) Inventor: Aaron M. Foster, Windermere, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/386,865

(22) Filed: Nov. 3, 2023

(51) Int. Cl.
*G05D 3/12* (2006.01)
*F42B 4/24* (2006.01)

(52) U.S. Cl.
CPC . *G05D 3/12* (2013.01); *F42B 4/24* (2013.01)

(58) Field of Classification Search
CPC .................................. G05D 3/12; F42B 4/24
USPC ......................................................... 235/404
See application file for complete search history.

(56) References Cited

FOREIGN PATENT DOCUMENTS

CN          102096296 A    *   6/2011

\* cited by examiner

*Primary Examiner* — Toan C Ly
(74) *Attorney, Agent, or Firm* — Farjami & Farjami LLP

(57) ABSTRACT

A system for providing a physical projection routine includes a hardware processor, a system memory storing a software code, and a projection platform. The hardware processor is configured to execute the software code to measure an environmental parameter of a venue, determine, based on the environmental parameter, a desired orientation of the projection platform for executing the physical projection routine, and orient the projection platform according to the desired orientation determined based on the environmental parameter. The hardware processor and software code then execute the physical projection routine by the projection platform oriented using the desired orientation determined based on the environmental parameter.

20 Claims, 4 Drawing Sheets

DYNAMIC ORIENTATION OF A PHYSICAL PROJECTION PLATFORM

BACKGROUND

Entertainment, irrigation, and fire mitigation applications relying on the physical projection of pyrotechnics, water, or flame retardant chemicals, for example, are vulnerable to changes in environmental parameters, such as wind speed or direction, temperature, and humidity, to name a few.

Firework shows, for example, typically utilize aerial shells which are propelled from a traditional fireworks mortar, while some more modern shows may utilize Air Launch Fireworks (ALF) technology in which fireworks are launched using compressed air rather than an explosive charge. Both of these types of fireworks lack in-flight control of the trajectory of the fireworks shells, which simply follow a projectile motion path based on the angle and direction with which they are aimed when launched. Because of the passive nature of the aerial shell, the projectile motion can be significantly affected by the winds present at the fireworks venue, which can cause a significant drift not only of the fireworks, but of the resulting fallout of the unburned shell casings as well. As a result, such wind drift affects both the creative intent of the fireworks and also has undesirable implications with respect to the area into which the fallout returns to ground, i.e., the "fallout area."

Controlling the fallout area is one of the most important aspects of fireworks deployment in large firework shows. In the industry there is a desire to avoid the effects of fallout to people, structures and environments related to excessive winds causing the pyrotechnic fallout to drift into unplanned areas. Analogous challenges to artistic intent are present for waterworks shows, while analogous challenges to practical effectiveness are present in irrigation and fire mitigation use cases. Thus, there is a need in the art for a solution for actively monitoring environmental parameters and dynamically adjusting the orientation of a physical projection system to compensate for those environmental effects.

DETAILED DESCRIPTION

Figure 1:
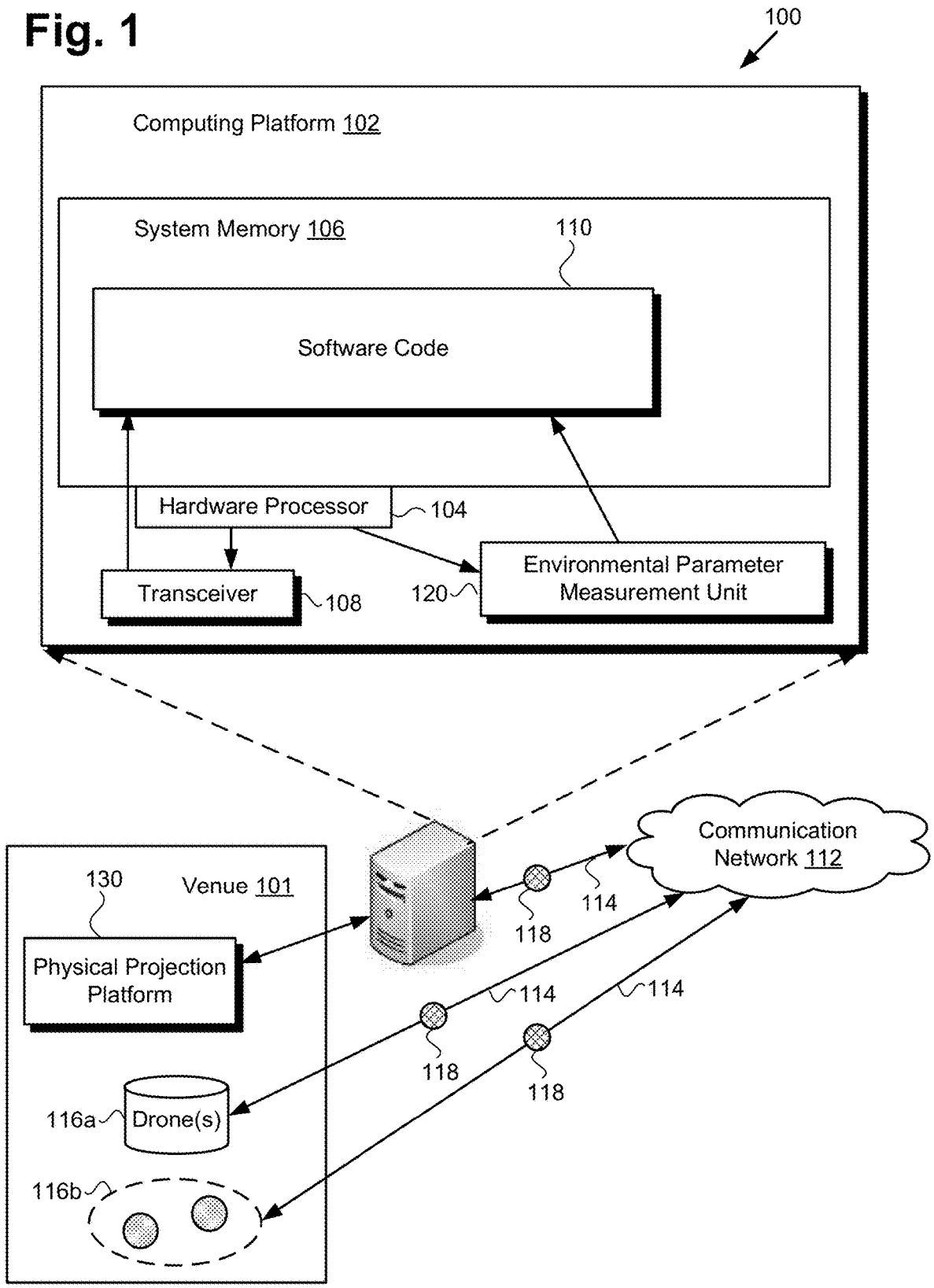
FIG. 1 shows a diagram of a system for dynamically orienting a physical projection platform, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present application is directed to systems and methods for dynamically orienting a physical projection platform that address and overcome the deficiencies in the conventional art. The novel and inventive concepts disclosed in the present application advance the state-of-the-art by actively monitoring one or more environmental parameters and dynamically orienting or re-orienting the physical projection platform, such as by adjusting at least one of an elevation, a polar angle, or an azimuthal angle of a projection surface of the physical projection platform, in response to the environmental parameter(s). As a result, the artistic intent of a pyrotechnic or other physical projection-based entertainment can more readily be adhered to, while lessening the impact to onlookers and nearby structures and environments (e.g., foliage, waterways, fauna and the like) from pyrotechnic or other physical fallout. Moreover, the present solution may be implemented as substantially automated systems and methods.

As defined in the present application, the terms "automation," "automated," and "automating" refer to systems and processes that do not require human intervention. Although in some implementations a human operator may supervise the systems using the methods described herein, that human involvement is optional. Thus, the methods described in the present application may be performed under the control of hardware processing components of the disclosed automated systems.

FIG. 1 shows a diagram of system 100 for dynamically orienting a physical projection platform, according to one exemplary implementation. As shown in FIG. 1, system 100 includes computing platform 102 having hardware processor 104, transceiver 108, environmental parameter measurement unit 120, and system memory 106 implemented as a non-transitory storage device storing software code 110. In addition, system 100 includes physical projection platform 130 (hereinafter "projection platform 130"), located in venue 101 for a physical projection routine such as a fireworks show for example, and communicatively coupled to computing platform 102, i.e., via a wired or wireless communication link. It is noted that although FIG. 1 depicts projection platform 130 as being physically separate from computing platform 102, that representation is provided merely by way of example. In some implementations computing platform 102 and projection platform 130 may be integrated into a single apparatus. Thus, in those implementations, system 100 may be located in venue 101 as well.

As further shown in FIG. 1, system 100 is implemented within a use environment including communication network 112 providing network communication links 114, one or more aerial drones 116a (hereinafter "aerial drone(s) 116a"), and one or more remote environmental sensors 116b (hereinafter "remote environmental sensor(s) 116b") in wireless communication with system 100. Also shown in FIG. 1 is sensor data 118 received by system 100 from aerial drone(s) 116a, remote environmental sensor(s) 116b, or aerial drone(s) 116a and remote environmental sensors via communication network 112 and network communication links 114.

Although the present application refers to software code 110 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, in some implementations, system 100 may utilize a decentralized secure digital ledger in addition to, or in place of, system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

It is noted that although FIG. 1 depicts software code 110 as being stored in its entirety in a single instantiation of system memory 106, that representation is also merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

Transceiver 108 may be implemented as a wireless communication unit configured for use with one or more of a variety of wireless communication protocols. For example, transceiver 108 may include a fourth generation (4G) wireless transceiver and/or a 5G wireless transceiver. In addition, or alternatively, transceiver 108 may be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. In addition, or alternatively, in some implementations, system 100 may utilize a local area broadcast method, such as User Datagram Protocol (UDP) or Bluetooth, for instance. Furthermore, in some implementations, computing platform 102 may be implemented virtually, such as in a data center. For example, in some implementations, computing platform 102 may be implemented in software, or as virtual machines. Moreover, in some implementations, communication network 112 may be a high-speed network suitable for high performance computing (HPC), for example a 10 GigE network or an Infiniband network.

Alternatively, in some implementations computing platform 102 may take the form of a of a personal computing device, such as a desktop computer or any other suitable mobile or stationary computing system that implements data processing capabilities sufficient to support connections to communication network 112 and implement the control of projection platform 130 ascribed to computing platform 102 herein. For example, in other implementations, computing platform 102 may take the form of a laptop computer, tablet computer, or smartphone, for example.

Figure 2:
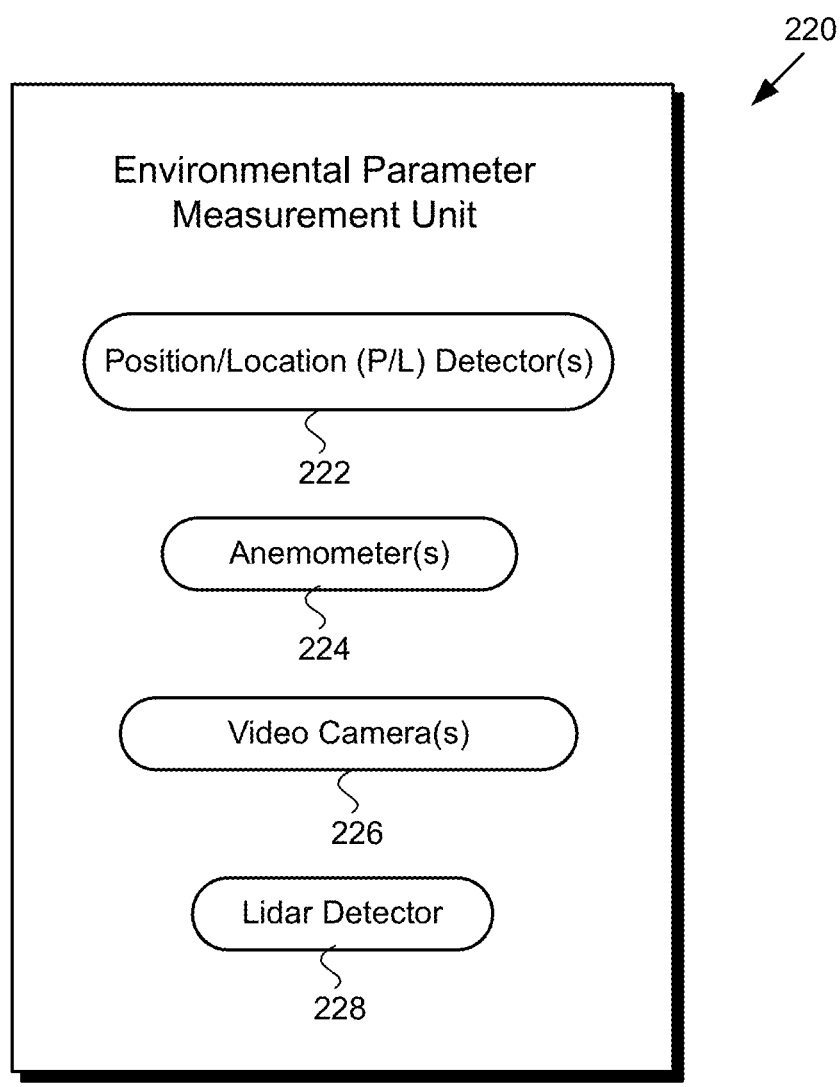
FIG. 2 shows a more detailed diagram of an environmental parameter measurement unit suitable for use in the system of FIG. 1, according to one implementation.

FIG. 2 shows a more detailed diagram of environmental parameter measurement unit 220 suitable for use in system 100, in FIG. 1, according to one implementation. As shown in FIG. 2, environmental parameter measurement unit 220 may include one or more position/location detectors 222 (hereinafter "P/L detector(s) 222"), one or more anemometers 224 (hereinafter "anemometer(s) 224"), one or more video cameras 226 (hereinafter "video camera(s) 226"), and light detection and ranging (LIDAR) detector 228. Environmental parameter measurement unit 220 corresponds in general to environmental parameter measurement unit 120, in FIG. 1. Thus, environmental parameter measurement unit 120 may share any of the characteristics attributed to environmental parameter measurement unit 220 by the present disclosure, and vice versa.

It is noted that the specific detectors shown to be included in environmental parameter measurement unit 120/220 are merely exemplary, and in other implementations, environmental parameter measurement unit 120/220 may include more, or fewer, detectors than P/L detector(s) 222, anemometer(s) 224, video camera(s) 226, and LIDAR detector 228. Moreover, in other implementations, environmental parameter measurement unit 120/220 may include a detector or detectors other than one or more of P/L detector(s) 222, anemometer(s) 224, video camera(s) 226, and LIDAR detector 228. It is further noted that P/L detector(s) 222 may include one or more of accelerometers, gyroscopes, a Global Positioning System (GPS) receiver, and a magnetometer, for example. In some implementations, P/L detector(s) 222 may be implemented as an inertial measurement unit (IMU), as known in the art.

It is preferred that environmental parameter measurement unit 120/220 measure conditions in a three-dimensional space. Windage can vary with altitude, latitude and longitude, particularly with obstructions such as buildings and foliage. Environmental parameter measurement unit 120/220 preferably measures atmospheric conditions at various altitudes above launch and up to a height sufficiently above launch for a particular implementation. Environmental parameter measurement unit 120/220 is described herein primarily as a stationary device implemented separately from a projectile shell (shown as shell 335 in FIG. 3). However, it should be understood that, in some use cases, environmental parameter measurement unit 120/220 can be implemented as one or more mobile devices such as aerial drones 116a, or may be implemented as one or more telemetry devices onboard shell 335 in the form of a fireworks shell. Alternatively, environmental parameter measurement unit 120/220 may be implemented onboard shell 335 in the form of a dummy or sounding shell (hereinafter "sounding shell") holding only telemetry and perhaps ParaLite device(s) that function primarily to measure atmospheric conditions rather than explode to produce fireworks effects.

Figure 3:
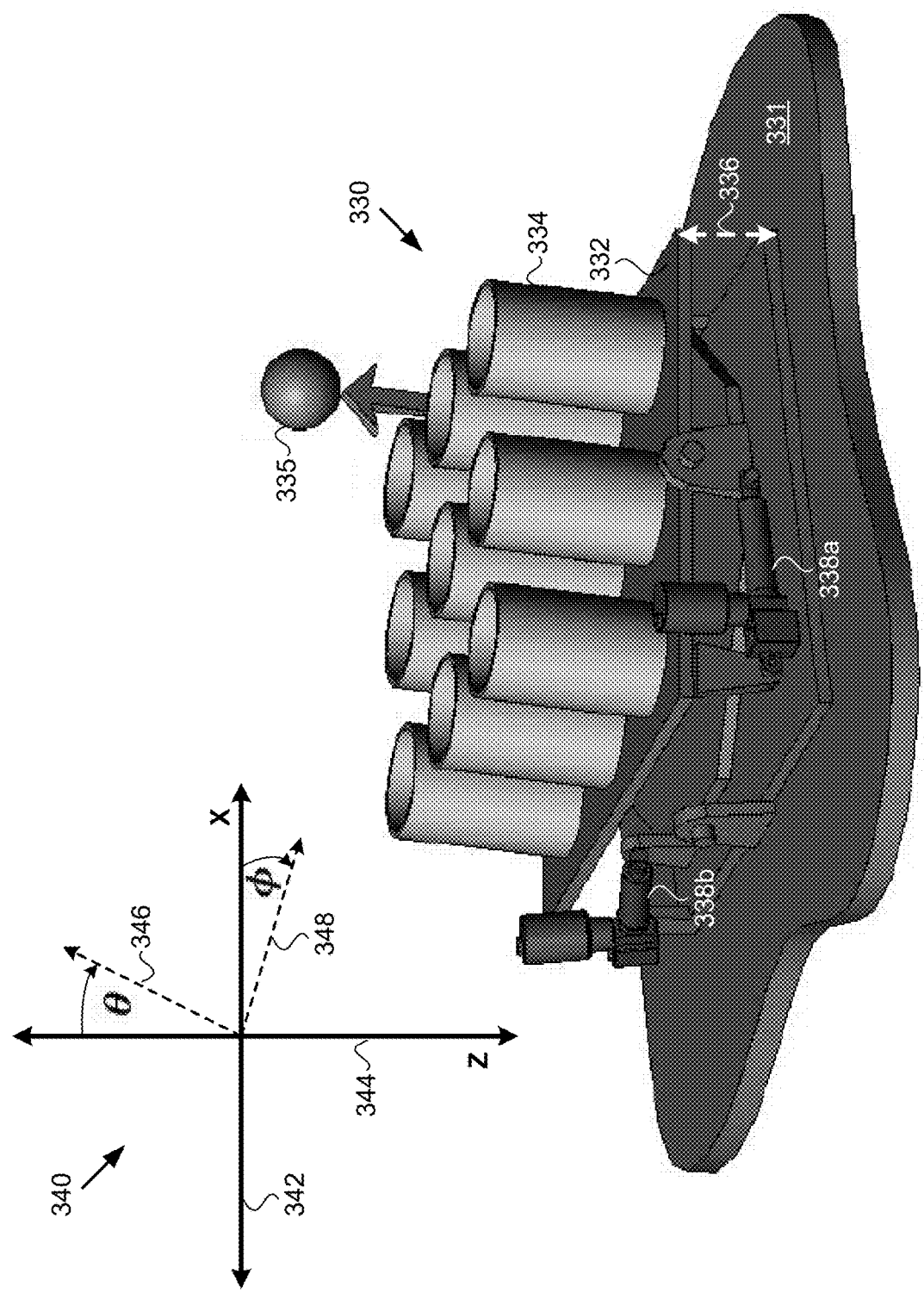
FIG. 3 shows a more detailed diagram of a physical projection platform of the system of FIG. 1, according to one implementation.

FIG. 3 shows a more detailed diagram of physical projection platform 330 of system 100, in FIG. 1, according to one implementation. As shown in FIG. 3, physical projection platform 330 (hereinafter "projection platform 330") has projection surface 332 having situated thereon one or more projection devices 334 (hereinafter "projection device(s) 334"), shown as exemplary fireworks mortar tubes in FIG. 3. As further shown in FIG. 3 projection platform 330 includes one or more positional actuators, depicted in FIG. 3 as positional actuators 338a and 338b. In addition, FIG. 3 shows exemplary shell 335, which may be a fireworks shell for example, expelled by one of projection devices 334.

Also shown in FIG. 3 is elevation 336 of projection platform 330 above level ground 331, and coordinate system 340 including horizontal "x" axis 342 parallel to the surface plane of level ground 331, and vertical "z" axis 344 perpendicular to horizontal x axis 342 and the surface plane of level ground 331. Coordinate system 340 depicts polar angle 346 and azimuthal angle 348 of projection surface 332. It is noted that as defined in the present application, the feature "polar angle" 346 of projection surface 332 refers to the angle between vertical z axis 344 and a surface normal vector of projection surface 332, while the feature "azimuthal angle" 348 refers to the angle between horizontal x axis 342 and the projection of the surface normal vector of projection surface 332 onto the plane perpendicular to vertical z axis 344.

It is further noted that, as defined for the purposes of the application, the term "elevation" 336 of projection surface 332 refers to the height of projection surface 332 above level ground 331 at the lowest point of projection surface 332. Thus, when projection surface 336 is parallel to horizontal x axis 342 and the surface plane of level ground 331, i.e., polar angle 346 is equal to zero degrees (0°), elevation 336 of projection surface 332 is substantially the same across the entirety of projection surface 332. With respect to the exemplary implementation shown in FIG. 3, the orientation parameters elevation 336, polar angle 346, and azimuthal angle 348 can be adjusted using one or more of positional actuators 338a and 338b.

Projection platform 330 corresponds in general to projection platform 130, in FIG. 1. Consequently, projection platform 130 may share any of the characteristics attributed to projection platform 330 by the present disclosure, and vice versa. That is to say, like projection platform 330, projection platform 130 may include projection device(s) 334, one or more positional actuators 338a and 338b, and may include projection surface 332 having its orientation characterized by the parameters elevation 336, polar angle 346, and azimuthal angle 348. Moreover, like projection platform 130, projection platform 330 may be a component of system 100 separate from but communicatively coupled to computing platform 102, or may be physically integrated with computing platform 102.

It is emphasized that although FIG. 3 depicts projection platform 330 as a fireworks platform for executing a physical projection routine in the form of a fireworks show or other pyrotechnic entertainment, that representation is provided merely by way of example. In other use cases, projection platform 330 may be implemented so as to provide a physical projection routine in the form of a waterworks show, may include other types of projection devices, such as sprinkler heads for use in irrigation or fire mitigation, nozzles for spraying fire retardant chemicals, or any combination thereof.

Figure 4:
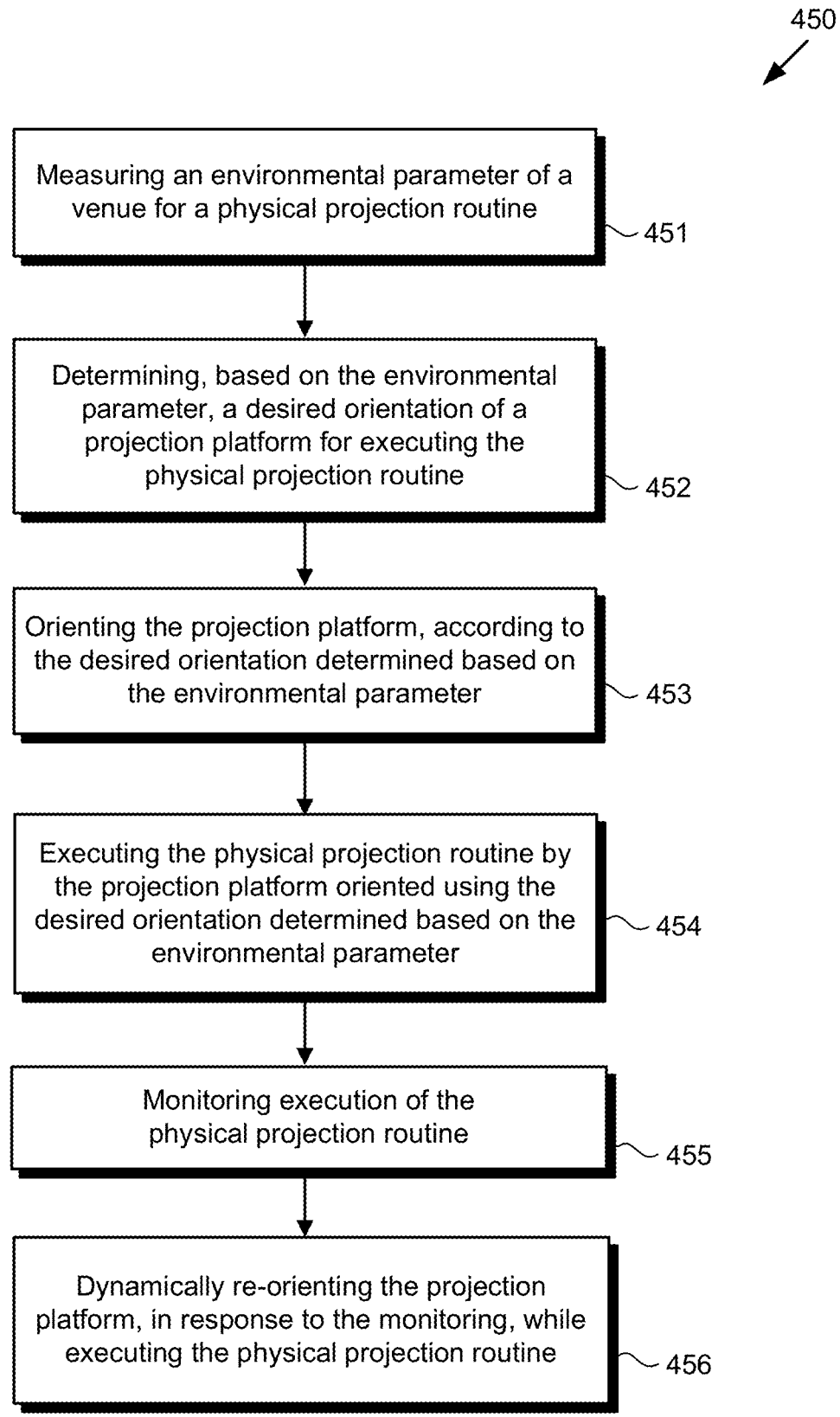
FIG. 4 shows a flowchart presenting an exemplary method for use by a system for dynamically orienting a physical projection platform, according to one implementation.

The operation of system 100 including projection platform 130/330 will be further described by reference to FIG. 4. FIG. 4 shows flowchart 450 presenting an exemplary method for use by a system for dynamically orienting a physical projection platform, according to one implementation. With respect to the actions outlined in FIG. 4, it is noted that certain details and features have been left out of flowchart 450 in order not to obscure the discussion of the inventive features in the present application.

Referring to FIG. 4 in combination with FIG. 1, flowchart 450 begins with measuring one or more environmental parameters (hereinafter "environmental parameter(s)") of venue 101 for a physical projection routine (action 451). As noted above, the physical projection routine to be executed in venue 101 may be a fireworks show or other pyrotechnic entertainment, or a waterworks or fountain-based entertainment. In those use cases, venue 101 for the physical projection routine may be or include a park or other outdoor recreational area, or a resort property, to name a few examples. In other use cases, the physical projection routine to be executed in venue 101 may include an agricultural irrigation routine, or the dispersal of water or fire retardant chemicals in the event of fire. In those latter use cases, venue 101 for the physical projection routine may be or include an agricultural, industrial, commercial, or residential property.

In some implementations, for example, the environmental parameter(s) measured in action 451 may include one or both of wind speed and wind direction. Alternatively, or in addition, the environmental parameter(s) measured in action 451 may include one or more of temperature, humidity, barometric pressure, and sound, for instance. Referring to FIGS. 1, 2, and 4 in combination, in various implementations, the measurement of environmental parameter(s) in action 451 of flowchart 450 may be performed by software code 110, executed by hardware processor 104, and using one or more of anemometer(s) 224, video camera(s), and LIDAR detector 228 of environmental parameter measurement unit 120/220 of system 100, for example. In some implementations, action 451 may be performed further based on sensor data 118 received by system 100 from aerial drone(s) 116a, remote environmental sensor(s) 116b, or aerial drone(s) 116a and remote environmental sensor(s) 116b in wireless communication with system 100 via communication network 112 and network communication links 114.

Thus, in some implementations, the one or more remote sensors from which sensor data 118 may be received in action 451 may be aerial drone(s) 116a or may be embodied in aerial drone(s) 116a. By way of example, in implementations in which the environmental parameter(s) being measured in action 451 are wind speed and direction, an array of aerial drone(s) 116a, remote environmental sensor(s) 116b, or aerial drone(s) 116a and remote environmental sensor(s)

116b may be used to measure wind speed and direction at multiple different locations and at multiple different altitudes within venue 101.

Moreover, and as noted above by reference to FIGS. 2 and 3, in some use cases, environmental parameter measurement unit 120/220 can be implemented as one or more telemetry devices onboard shell 335 in the form of a fireworks shell. Alternatively, environmental parameter measurement unit 120/220 may be implemented onboard shell 335 in the form of a sounding shell holding only telemetry and perhaps ParaLite device(s) that function primarily to measure atmospheric conditions rather than explode to produce fireworks effects.

Referring to FIG. 4 in combination with FIGS. 1 and 3, flowchart 450 further includes determining, based on the environmental parameter(s) measured in action 451, a desired orientation of projection platform 130/330 for executing the physical projection routine (action 452). Determination of the desired orientation of projection platform 130/330, in action 452, may be performed by software code 110, executed by hardware processor 104 of system 100. In addition to the environmental parameter(s) measured in action 451, the desired orientation of projection platform 130/330 may further depend on the type of projectile or projective substance to be used, e.g., fireworks shells versus water versus chemicals, its weight, drag coefficient, surface tension, shear or other deformation characteristics, and the like.

Continuing to refer to FIG. 4 in combination with FIGS. 1 and 3, flowchart 450 further includes orienting projection platform 130/330, according to the desired orientation determined in action 452 based on the environmental parameter(s) measured in action 451 (action 453). Orientation of projection platform 130/330 according to the desired orientation determined in action 452 may be performed by software code 110, executed by hardware processor 104 of system 100. As described above by reference to FIG. 3, action 453 may include adjusting one or more of elevation 336, polar angle 346, or azimuthal angle 348 of projection surface 332 of projection platform 130/330.

In addition, in some implementations wherein projection platform 130/330 includes projection device(s) 334 in the form of one or more fireworks mortar tubes, action 453 may further include modifying the energy with which fireworks shells are expelled from one or more of those fireworks mortar tubes, based on one or more of the environmental parameter(s) measured in action 451 and the desired orientation of projection platform 130/330 determined in action 452. For example, in implementations in which fireworks shells are launched using an explosive propellant, the propellant ventilation setting of one or more of the fireworks mortar tubed may be modified to tune the exit velocity of the fireworks shell. As another example, in implementations in which Air Launch Fireworks (ALF) technology is employed, such that fireworks are launched using compressed air rather than an explosive propellant, the pneumatic pressure of the fireworks mortar tube may be modified to tune the exit velocity of the fireworks shell.

Continuing to refer to FIG. 4 in combination with FIGS. 1 and 3, 450 further includes executing the physical projection routine by projection platform 130/330 oriented using the desired orientation determined in action 452 based on the environmental parameter(s) measured in action 451 (action 454). Action 454 may be performed by projection platform 130/330 under the control of software code 110, executed by hardware processor 104 of system 100. It is noted that the predictability, effectiveness, or predictability and effectiveness with which the physical projection routine is executed, in action 454, is advantageously and substantially enhanced by preceding actions 451, 452, and 453.

In some use cases, the method outlined by flowchart 450 may conclude with action 454 described above. However, and as shown by FIG. 4, in some implementations flowchart 450 may further include monitoring execution of the physical projection routine executed in action 454 (action 455). Referring to FIGS. 1, 2, and 4 in combination, in some implementations, the monitoring of the physical projection routine executed in action 454 of flowchart 450 may be performed by software code 110, executed by hardware processor 104, and using video camera(s) 226 of environmental parameter measurement unit 120/220, LIDAR detector 228 of environmental parameter measurement unit 120/220, or video camera(s) 226 and LIDAR detector 228. Alternatively, or in addition, monitoring of the physical projection routine executed in action 454 may be performed by software code 110, executed by hardware processor 104 of system 100, using one or more video cameras carried by aerial drone(s) 116a or included among remote environmental sensor(s) 116b.

It is noted that although flowchart 450 depicts action 455 as following action 454, that representation is merely provided in the interests of conceptual clarity due to the optional nature of action 455. That is to say, in implementations in which flowchart 450 includes action 455, actions 454 and 455 are typically performed in parallel, i.e., contemporaneously.

Referring to FIG. 4 in combination with FIGS. 1 and 3, flowchart 450 may further include dynamically re-orienting projection platform 130/330, in response to the monitoring performed in action 455, while executing the physical projection routine as part of action 454 (action 456). The dynamic reorientation of projection platform 130/330 in response to the monitoring of action 455 may be performed by software code 110, executed by hardware processor 104 of system 100. Such dynamic re-orientation may include modification of one or more of elevation 336, polar angle 346, and azimuthal angle 348 of projection surface 332 of projection platform 130/330.

It is noted that action 456 advantageously enables system 100 to be dynamically responsive to unforeseen changes in environmental conditions during execution of the physical projection routine during action 454, thereby further enhancing the predictability, effectiveness, or predictability and effectiveness with which the physical projection routine can be executed. It is further noted that although flowchart 450 depicts action 456 as following action 454, that representation too is merely provided in the interests of conceptual clarity due to the optional nature of action 456. Thus, in implementations in which flowchart 450 includes actions 455 and 456, actions 455 and 456 are typically performed in parallel, i.e., contemporaneously with action 454.

With respect to the method outlined by flowchart 450, it is also noted that actions 451, 452, 453, and 454 (hereinafter "actions 451-454"), or actions 451-454 and 455, or actions 451-454, 455, and 456, may be performed in an automated method from which human intervention may be omitted.

Thus, the present application discloses systems and methods for dynamically orienting a physical projection platform that address and overcome the deficiencies in the conventional art. The novel and inventive concepts disclosed in the present application advance the state-of-the-art by actively monitoring one or more environmental parameters and dynamically orienting or re-orienting the physical projection platform, such as by adjusting at least one of an elevation, a polar angle, or an azimuthal angle of a projection surface of the projection platform, in response to the environmental parameter(s). As a result, the artistic intent of a pyrotechnic or other physical projection-based entertainment can more readily be adhered to, while ensuring the lessening of impact of onlookers, surrounding structures and environment from pyrotechnic or other physical fallout.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system configured to provide a physical projection routine, the system comprising:
   a hardware processor;
   a system memory storing a software code; and
   a projection platform;
   the hardware processor configured to execute the software code to:
      measure an environmental parameter of a venue;
      determine, based on the environmental parameter, a desired orientation of the projection platform for executing the physical projection routine;
      orient the projection platform, according to the desired orientation determined based on the environmental parameter; and
      execute the physical projection routine by the projection platform oriented using the desired orientation determined based on the environmental parameter.

2. The system of claim 1, wherein orienting the projection platform comprises adjusting at least one of an elevation, a polar angle, or an azimuthal angle of a projection surface of the projection platform.

3. The system of claim 1, wherein the hardware processor is further configured to execute the software code to:
   monitor execution of the physical projection routine; and
   dynamically re-orient the projection platform, in response to monitoring, while executing the physical projection routine.

4. The system of claim 3, wherein monitoring of the execution of the physical projection routine is performed using a video camera.

5. The system of claim 1, wherein the physical projection routine comprises a pyrotechnic entertainment, and wherein the projection platform comprises one or more fireworks mortar tubes.

6. The system of claim 5, wherein the hardware processor is further configured to execute the software code to:
   modify, based on at least one of the environmental parameter or the desired orientation, a pneumatic pressure or a propellant ventilation setting of at least one of the one or more fireworks mortar tubes.

7. The system of claim 1, wherein the environmental parameter comprises at least one of a wind speed or a wind direction.

8. The system of claim 1, wherein the environmental parameter is measured using a respective measurement unit onboard at least one of a fireworks shell or a sounding shell.

9. The system of claim 1, wherein the environmental parameter is measured based on sensor data received from at least one of: (i) one or more sensors of the system, or (ii) one or more remote sensors in wireless communication with the system.

10. The system of claim 9, wherein the one or more remote sensors are aerial drones or are embodied in one or more aerial drones.

11. A method for use by a system configured to provide a physical projection routine, the system including a hardware processor, a system memory storing a software code, and a projection platform, the method comprising:
   measuring, by the software code executed by the hardware processor, an environmental parameter of a venue;
   determining, by the software code executed by the hardware processor based on the environmental parameter, a desired orientation of the projection platform for executing the physical projection routine;
   orienting the projection platform, by the software code executed by the hardware processor according to the desired orientation determined based on the environmental parameter; and
   executing the physical projection routine, by the software code executed by the hardware processor, using the projection platform oriented using the desired orientation determined based on the environmental parameter.

12. The method of claim 11, wherein orienting the projection platform comprises adjusting at least one of an elevation, a polar angle, or an azimuthal angle of a projection surface of the projection platform.

13. The method of claim 11, further comprising:
   monitoring, by the software code executed by the hardware processor, execution of the physical projection routine; and
   dynamically re-orienting the projection platform, by the software code executed by the hardware processor in response to monitoring, while executing the physical projection routine.

14. The method of claim 13, wherein monitoring of the execution of the physical projection routine is performed using a video camera.

15. The method of claim 11, wherein the physical projection routine comprises a pyrotechnic entertainment, and wherein the projection platform comprises one or more fireworks mortar tubes.

16. The method of claim 15, further comprising:
   modifying, by the software code executed by the hardware processor based on at least one of the environmental parameter or the desired orientation, a pneumatic pressure or a propellant ventilation setting of at least one of the one or more fireworks mortar tubes.

17. The method of claim 11, wherein the environmental parameter comprises at least one of wind speed or wind direction.

18. The method of claim 11, wherein the environmental parameter is measured using a respective measurement unit onboard at least one of a fireworks shell or a sounding shell.

19. The method of claim 11, wherein the environmental parameter is measured based on sensor data received from at least one of: (i) one or more sensors of the system, or (ii) one or more remote sensors in wireless communication with the system.

20. The method of claim 19, wherein the one or more remote sensors are aerial drones or are embodied in one or more aerial drones.

\* \* \* \* \*